(12) United States Patent
Elisson et al.

(10) Patent No.: US 7,840,111 B2
(45) Date of Patent: Nov. 23, 2010

(54) RACK FOR OPTICAL DISTRIBUTION FRAME

(75) Inventors: Peter Elisson, Boras (SE); Jörgen Persson, Grimsas (SE); Larry Felixson, Grimsas (SE); Christer Larsson, Gällstad (SE)

(73) Assignee: Nexans, Paris (FR)

( * ) Notice: Subject to any disclaimer, the term of this patent is extended or adjusted under 35 U.S.C. 154(b) by 35 days.

(21) Appl. No.: 12/214,415

(22) Filed: Jun. 18, 2008

(65) Prior Publication Data
US 2009/0010607 A1    Jan. 8, 2009

(30) Foreign Application Priority Data
Jul. 4, 2007  (EP) ................................. 07301205

(51) Int. Cl.
*G02B 6/00* (2006.01)

(52) U.S. Cl. ...................... 385/135; 385/147
(58) Field of Classification Search ......... 385/129–139, 385/141, 147
See application file for complete search history.

(56) References Cited

U.S. PATENT DOCUMENTS

| | | | | |
|---|---|---|---|---|
| 5,625,737 A | 4/1997 | Saito | .......................... | 385/187 |
| 6,212,014 B1 | 4/2001 | Lehman, Jr. et al. | ........ | 359/640 |
| 6,327,139 B1 | 12/2001 | Champion | .................. | 361/608 |
| 6,535,682 B1 | 3/2003 | Puetz et al. | .................. | 385/135 |
| 7,139,461 B2 * | 11/2006 | Puetz et al. | .................. | 385/135 |
| 7,149,398 B2 * | 12/2006 | Solheid et al. | .............. | 385/135 |
| 7,200,317 B2 * | 4/2007 | Reagan et al. | ............... | 385/139 |
| 7,333,707 B2 * | 2/2008 | Puetz et al. | .................. | 385/135 |
| 7,376,321 B2 * | 5/2008 | Bolster et al. | ............... | 385/135 |
| 7,471,869 B2 * | 12/2008 | Reagan et al. | ............... | 385/139 |
| 2002/0136519 A1 | 9/2002 | Tinucci et al. | .............. | 385/134 |

FOREIGN PATENT DOCUMENTS

| | | |
|---|---|---|
| EP | 0538164 | 4/1993 |
| EP | 1621908 | 2/2006 |
| FR | 2832225 | 5/2003 |
| WO | 0205002 | 1/2002 |

OTHER PUBLICATIONS

European Search Report dated Nov. 5, 2007.

* cited by examiner

*Primary Examiner*—Akm E Ullah
(74) *Attorney, Agent, or Firm*—Sofer & Haroun, LLP

(57) ABSTRACT

A rack (1) for optical distribution frame includes a plurality of horizontal supports for sockets with connections on a front face (1A) of the rack and means for management of the bundles of optical cables outside each socket. These means for management are made from a plurality of guiding systems (2A to 2E) of the cables, disposed on at least one side wall (1B) of the rack, distributed on the height of the rack and comprising at least one element of reception (C) of cables opened towards outside. The element of reception is in shape of U, the base of the U being fixed to the side wall (1B), and comprises an articulated closing lever (L).

6 Claims, 4 Drawing Sheets

RACK FOR OPTICAL DISTRIBUTION FRAME

RELATED APPLICATIONS

This application claims the benefit of priority from European Patent Application No. 07 301 205.6, filed on Jul. 4, 2007, the entirety of which is incorporated herein by reference.

FIELD OF THE INVENTION

The invention relates to an optical distribution frame, more particularly intended for allowing interconnections which are made selectively between optical fiber links in a telecommunication installation comprising a large number of these fiber links.

BACKGROUND

Such frame comprises usually one or more aligned distribution racks, each of which includes a set of sockets or cross-connect box supported by horizontal supports, as described in patent document FR 2 832 225.

These sockets are for selectively interconnecting fiber of distribution that terminate at the distribution frame, this interconnection being made by jumpers whose ends are fitted with plugs compatible with connection members of the sockets. The pair of racks can be separated from each other by a cross-connect area for running jumpers connecting the sockets of one of the racks to those of an other rack, the racks being usually being dedicated, for example one for outgoing links and the other to incoming links. If there is more than two racks, it is of course possible to provide for running jumpers either across a single cross-connect area between two of the racks or in distributing areas, each lying between two racks, if necessary. It must also be understood that, in a distribution frame comprising only one rack, it is possible to provide a cross-connect area for running jumpers vertically on one or both sides of the racks.

In order to manage the cables outside each socket, the document of U.S. Pat. No. 6,327,139 proposes arms with flexible linkage, on which the bundle of cables for interconnecting two or more racks is attached. This arms support the bundle exclusively near the equipped socket.

This arrangement of prior art poses some technical problems.

It is not really adapted to cables constituted by optical fiber. The bending radius of the cable in such arms makes it difficult to apply this solution to optical fiber which required minimum bending radii to insure that there is no breakage of the fiber in the optical cables.

This arrangement of arms can be used for a Limited number of optical cables which can be guided.

It support the bundle of cables exclusively near the equipped socket, and, outside the arms, the bundle is not guided and is not managed.

The patent document WO 02/05002 discloses a rack for optical distribution frame including a plurality of horizontal supports for sockets with connections on a front face of the rack and radius limiters outside each socket, disposed on at least one side wall of the rack.

OBJECTS AND SUMMARY

The object of the invention is to improve the management of the bundles of optical cables outside each socket, by means for guiding and retaining them between two different sockets, in order to access the bundles connected to one socket without disturbing other sockets in the same frame.

The invention solves this technical problem and to do so it provides a rack for optical distribution frame including a plurality of horizontal supports for sockets with connections on a front face of the rack and means for management of the bundles of optical cables outside each socket, these means for management being constituted by a plurality of guiding systems of said cables, disposed on at least one side wall of the rack, distributed on the height of the rack and comprising at least one element of reception of cables opened towards outside, characterized in that the said element of reception is in shape of U, the base of the U being fixed to the said side wall, and comprises an articulated closing lever.

According to one preferred feature of the invention, each guiding system comprises a plurality of said elements in shape of U in aligned series and one common said lever.

Preferably, the rack comprises a plurality of said guiding systems distributed on the major part of the height of the rack.

Preferably, said series is disposed inclined relating to a horizontal plane.

The rack according to the invention comprises preferably at least one safety tension system to ensure low tension of cables, disposed on the said side wall.

By means of this safety tension system excessive tension of cables is prevented and the cables are guided and kept well organized.

Said safety tension system can comprise a translatable guiding element stressed by a spring.

Said safety tension system can be associated to a supplementary guiding element situated near it on the said side wall.

The rack according to the invention comprises preferably a supplementary guiding element situated on the said front face.

BRIEF DESCRIPTION OF THE DRAWINGS

The invention, its features and its advantages are explained in the following description with reference to the figures referred to below.

The FIG. 1 is a perspective view of a rack according to the invention.

Figure 1:
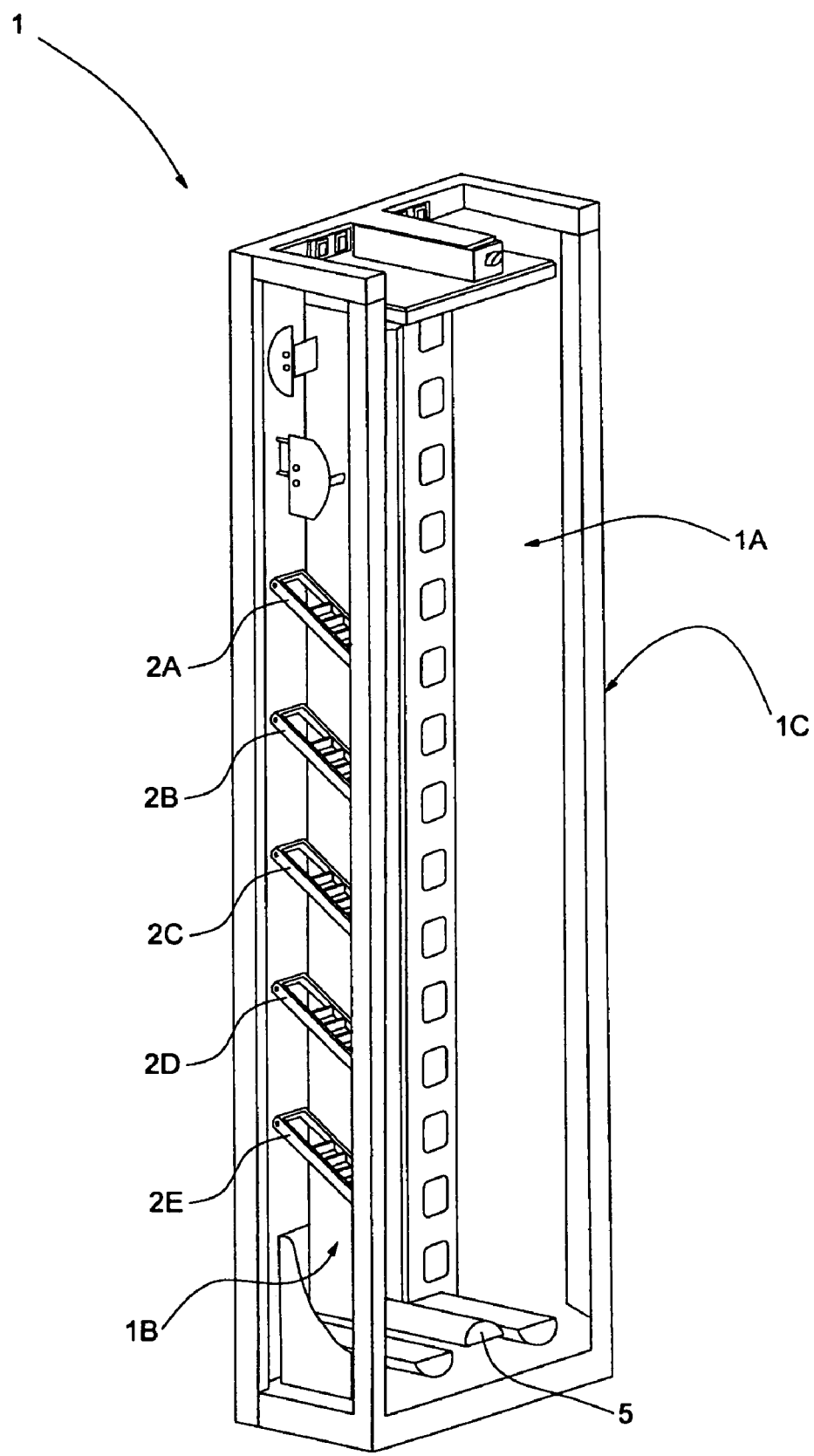
Figure 2:
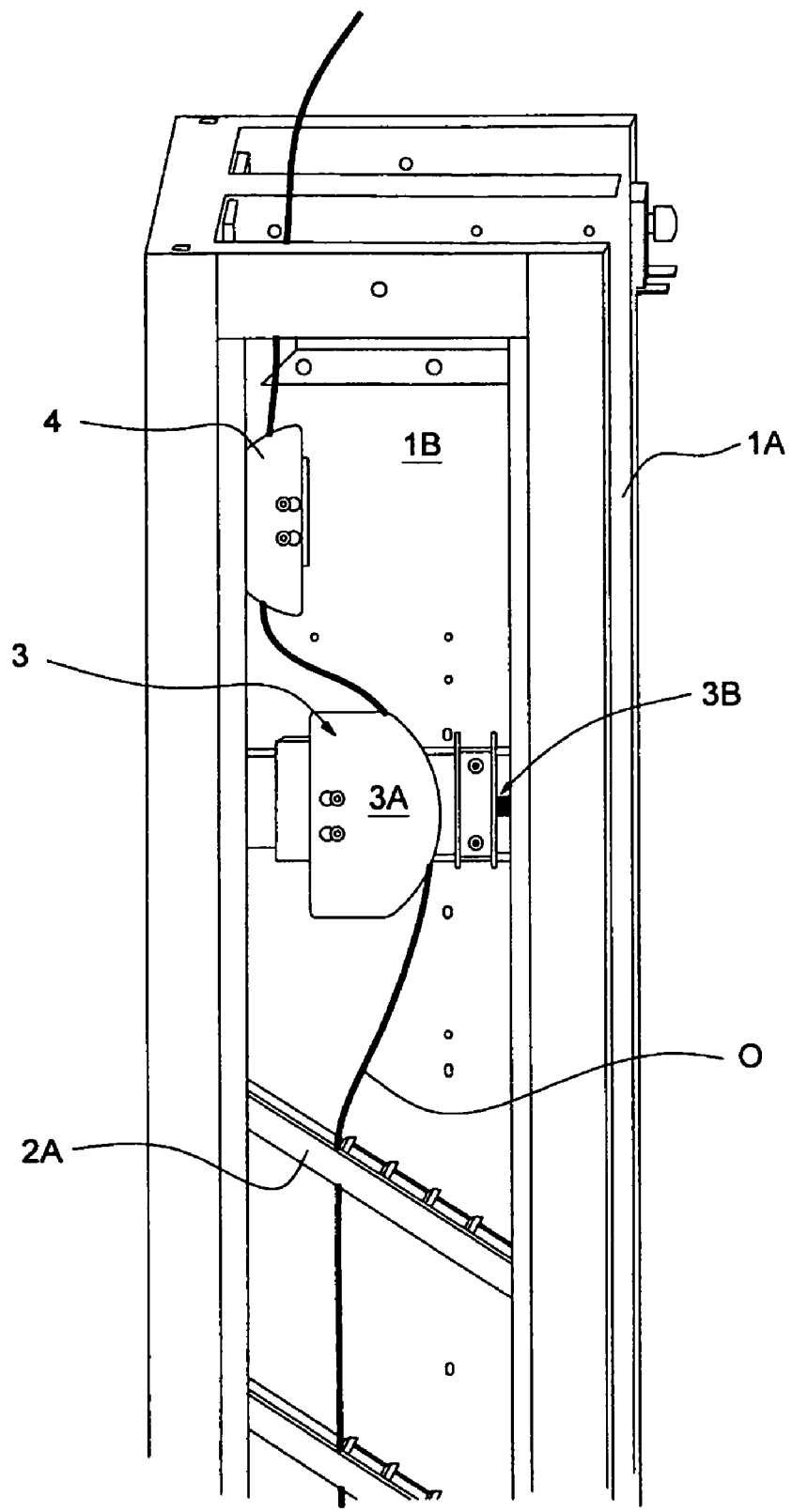
Figure 3:
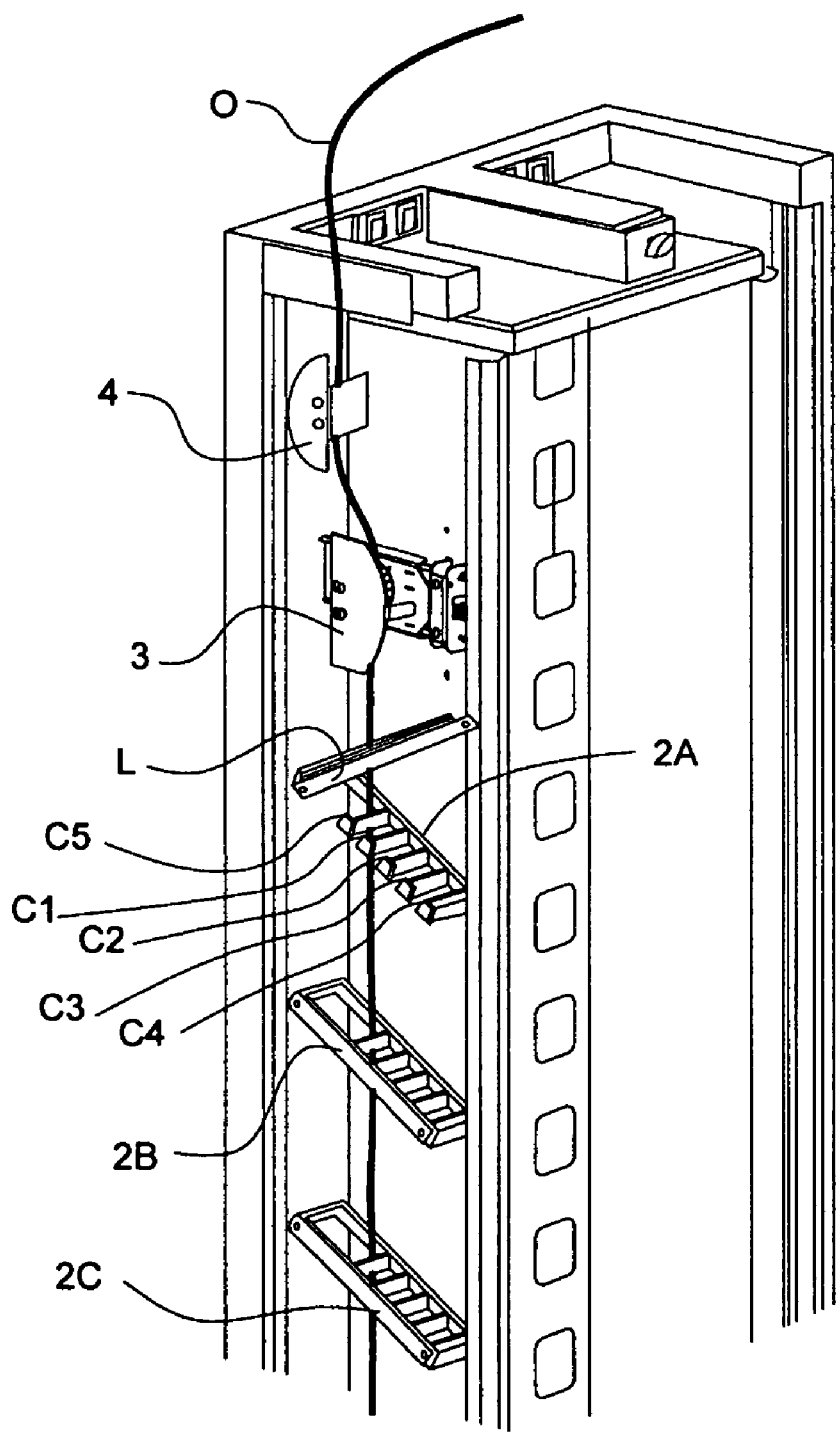
Figure 4:
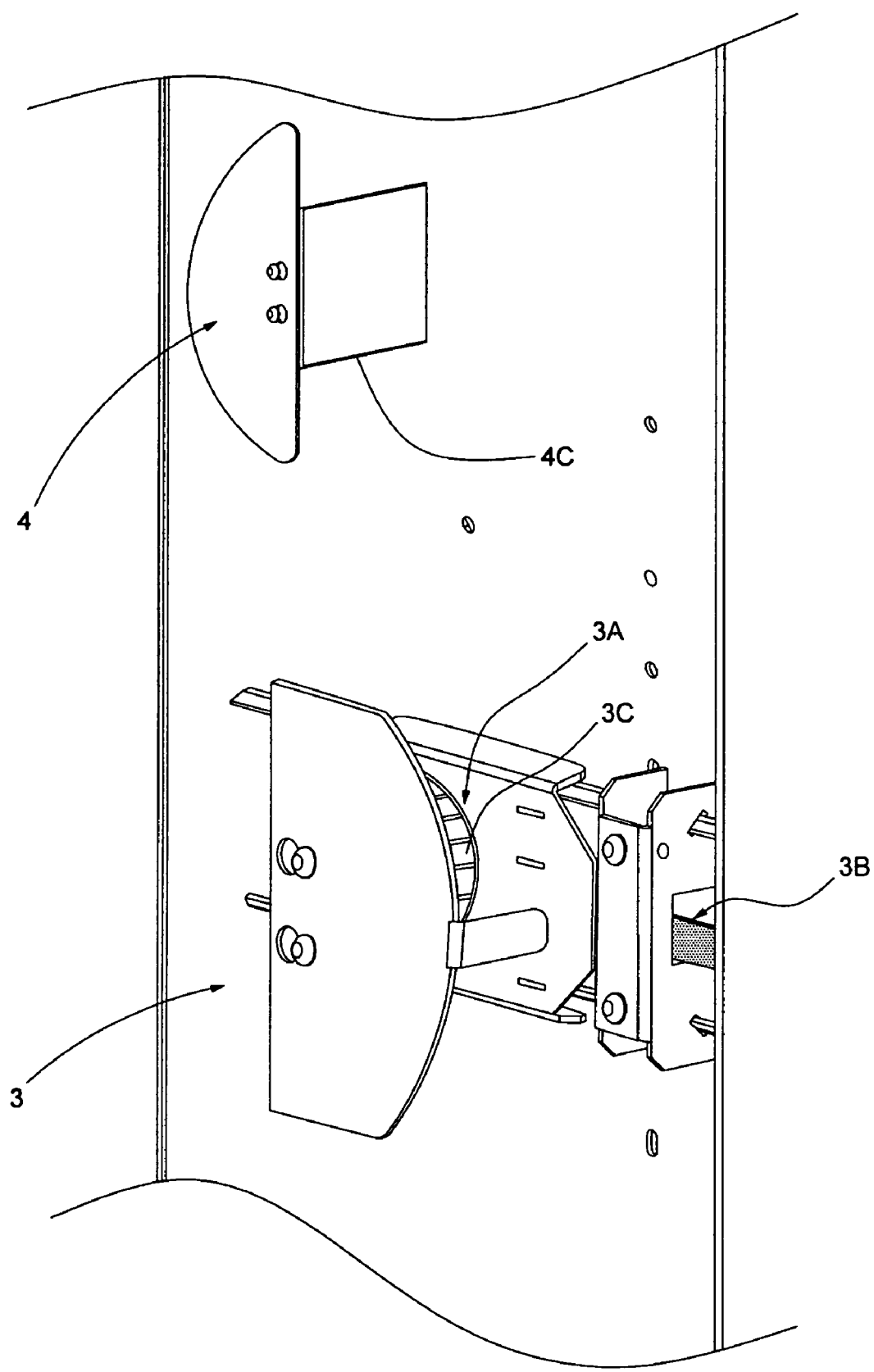

The FIGS. 2 to 4 are partial perspective views of a rack according to the invention.

As illustrated on the figures, a rack 1 for optical distribution frame include a plurality of horizontal supports for sockets with connections, which are not represented here because the rack is not equipped, on a front face 1A of the rack and means for management of the bundles of optical cables or patch cords outside each socket.

These means for management are constituted by at least one guiding system 2A to 2E of the cables, disposed on at least one side wall 1B of the rack.

In fact here, for example, the rack comprises five guiding systems distributed on the major part of the height of the rack, on this side wall.

Each guiding system 2A to 2E comprises at least one element of reception of cables opened towards outside. This element of reception $C_1$ to $C_5$ is in shape of U, the base of the U being fixed to the side wall 1B and comprises an articulated closing lever L In fact here, for example, each guiding system 2A to 2E comprises five elements $C_1$ to $C_5$ in shape of U in aligned series and one common articulated lever L, each series being disposed inclined relating to a horizontal plane, their up point being at the rear of the side wall.

This lever is in open position for the guiding system referenced 2A and in closed position for the other guiding systems 2B and 2C.

By means of these guiding systems, each cable O or each bundle of cables, that comes from one other associated rack or comes from a socket equipping the rack 1, can be introduced in a number of elements of reception C and blocked in position on all the height of the rack, by closing of each corresponding Lever L.

The rack according to the invention comprises too at least one tension system 3 to ensure low tension of cables, disposed on the side wall 1B.

This tension system comprises a translatable guiding element 3A stressed by a spring 3B. The guiding part of this guiding element 3A is in shape of a half of cylinder 3C and is movable along a horizontal axis, the spring 3B stresses it towards the right in view of the figures.

This tension system 3 is associated to a supplementary guiding element 4 situated near it on the side wall 1B. This guiding part of this supplementary guiding element 4 is in shape of a half of cylinder too, but its contact surface is arranged so that the cable or the bundle of cables forms a S, following the guiding part 3C and 4C of these both guiding element 3 and 4, in order to assure the safety tension function of the tension system 3.

Preferably, this tension system 3 is situated on the top of the side wall 1B of the rack.

The rack according to the invention comprises preferably a supplementary guiding element 5 situated on the inferior part of front face 1A, that assure a deviation in shape of Ω of the cable or cable bundle.

By means of the invention, optical cable or bundle of optical cables can be managed easily.

For example, the cable coming from the front face of one socket of the rack is deviated on the side and introduced in the nearest guiding system 2. It is guided towards the bottom of the rack by insertion in other guiding systems 2 on all the height of the side wall 1B, it is then distributed by the frontal guiding system 5 and shall be guided:

- towards one other rack after guiding along the other side wall, by means of analogue guiding systems disposed on this other side wall 1C or,
- towards one other part of a socket of the rack.

The invention claimed is:

1. A rack for optical distribution frame, said rack comprising:
   - a plurality of horizontal supports for sockets with connections on a front face of the rack; and
   - means for management of the bundles of optical cables outside each socket, including a plurality of guiding systems of said cables, disposed on at least one side wall of the rack, distributed on the height of the rack and including at least one element of reception of cables opened towards outside, wherein said element of reception is in shape of U, the base of the U being fixed to said side wall, and including an articulated closing lever and said rack includes at least one safety tension system to ensure low tension on said cables disposed on said side wall.

2. The rack according to claim 1, wherein each of said guiding systems includes a plurality of said elements in shape of U in aligned series and one common said lever.

3. The rack according to claim 2, wherein said series is disposed inclined relating to a horizontal plane.

4. The rack according to claim 1, wherein said safety tension system includes a translatable guiding element stressed by a spring.

5. The rack according to claim 1, wherein said safety tension system is associated to a supplementary guiding element situated near it on said side wall.

6. The rack according to claim 1, wherein said rack further comprises a supplementary guiding element situated on said front face.

* * * * *